United States Patent
You et al.

(10) Patent No.: US 11,540,284 B2
(45) Date of Patent: Dec. 27, 2022

(54) DATA TRANSMISSION METHOD AND DEVICE

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 21 days.

(21) Appl. No.: 17/025,174

(22) Filed: Sep. 18, 2020

(65) Prior Publication Data
US 2021/0006457 A1 Jan. 7, 2021

Related U.S. Application Data

(63) Continuation of application No. PCT/CN2018/079524, filed on Mar. 20, 2018.

(51) Int. Cl.
*H04B 7/0408* (2017.01)
*H04B 7/06* (2006.01)
(Continued)

(52) U.S. Cl.
CPC ........ *H04W 72/046* (2013.01); *H04B 7/0408* (2013.01); *H04B 7/0695* (2013.01);
(Continued)

(58) Field of Classification Search
CPC .. H04B 7/02–12; H04B 17/0082–3913; H04L 5/0001–0098; H04L 41/06–0695;
(Continued)

(56) References Cited

U.S. PATENT DOCUMENTS

2017/0367015 A1 12/2017 Zhang et al.
2019/0281480 A1* 9/2019 Wei ....................... H04W 76/19
(Continued)

FOREIGN PATENT DOCUMENTS

| CN | 102036284 A | 4/2011 |
|---|---|---|
| CN | 103329458 A | 9/2013 |

(Continued)

OTHER PUBLICATIONS

First Office Action issued in corresponding Chinese Application No. 202010463063.6, dated Jul. 12, 2021, 15 pages.
(Continued)

*Primary Examiner* — Timothy J Weidner
(74) *Attorney, Agent, or Firm* — Bayes PLLC

(57) ABSTRACT

Provided by the present disclosure are data transmission method and device. In an embodiment of the present disclosure, data transmission conditions of each serving cell among at least two serving cells is detected by means of a terminal so that the terminal may, according to the data transmission conditions of each serving cell, execute random access on a serving cell experiencing wave beam failure so as to update a service beam of the serving cell. Thus, when the terminal experiences wave beam failure in a serving cell in a carrier aggregation (CA) scenario, reliable data transmission may be achieved, and the reliability of data transmission may be effectively ensured.

10 Claims, 1 Drawing Sheet

(51) Int. Cl.
| | |
|---|---|
| H04B 7/08 | (2006.01) |
| H04B 17/17 | (2015.01) |
| H04B 17/18 | (2015.01) |
| H04B 17/382 | (2015.01) |
| H04L 5/00 | (2006.01) |
| H04L 41/0654 | (2022.01) |
| H04L 69/28 | (2022.01) |
| H04W 8/22 | (2009.01) |
| H04W 16/28 | (2009.01) |
| H04W 24/10 | (2009.01) |
| H04W 36/00 | (2009.01) |
| H04W 72/04 | (2009.01) |
| H04W 74/08 | (2009.01) |
| H04W 76/19 | (2018.01) |
| H04W 84/02 | (2009.01) |
| H04W 88/02 | (2009.01) |
| H04W 88/08 | (2009.01) |
| H04W 92/02 | (2009.01) |
| H04W 92/10 | (2009.01) |

(52) U.S. Cl.
CPC .......... *H04B 7/088* (2013.01); *H04B 17/17* (2015.01); *H04B 17/18* (2015.01); *H04B 17/382* (2015.01); *H04L 5/0085* (2013.01); *H04L 41/0672* (2013.01); *H04L 69/28* (2013.01); *H04W 8/22* (2013.01); *H04W 16/28* (2013.01); *H04W 24/10* (2013.01); *H04W 36/0069* (2018.08); *H04W 74/0833* (2013.01); *H04W 76/19* (2018.02); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC .................. H04L 69/28; H04W 8/22–245; H04W 16/28; H04W 24/02–10; H04W 36/0005–385; H04W 60/005–06; H04W 72/005–14; H04W 74/002–0891; H04W 76/10–50; H04W 84/02–16; H04W 88/02–12; H04W 92/02; H04W 92/04; H04W 92/10
See application file for complete search history.

(56) References Cited

U.S. PATENT DOCUMENTS

| | | | | |
|---|---|---|---|---|
| 2020/0374960 A1* | 11/2020 | Deenoo | ............ | H04W 74/0833 |
| 2021/0058129 A1* | 2/2021 | Takeda | ............ | H04W 74/0833 |

FOREIGN PATENT DOCUMENTS

| | | |
|---|---|---|
| CN | 107005859 A | 8/2017 |
| CN | 107211299 A | 9/2017 |
| CN | 107342801 A | 11/2017 |
| CN | 107635242 A | 1/2018 |
| CN | 107733501 A | 2/2018 |
| CN | 111418254 A | 7/2020 |
| EP | 3525516 A1 | 8/2019 |
| JP | 2021515477 A | 6/2021 |
| KR | 20120052179 A | 5/2012 |
| WO | 2016129916 A1 | 8/2016 |
| WO | 2019124983 A1 | 6/2019 |
| WO | 2019178731 A1 | 9/2019 |

OTHER PUBLICATIONS

"Remaining issues on DL beam failure recovery", Agenda Item: 7.1.2.2.4, Source: CATT, 3GPP TSG RAN WG1 Meeting #92, R1-1801722, Athens, Greece, Feb. 26-Mar. 2, 2018, 2 pages.

"Beam Failure Detection", Agenda Item: 10.3.1.4.2, Source: CATT, 3GPP TSG-RAN WG2#101, R2-1802142, Athens, Greece, Feb. 26-Mar. 2, 2018, 4 pages.

"Summary on Remaing issues on Beam Failure Recovery", Agenda Item: 7.1.2.2.4, Source: MediaTek Inc., 3GPP TSG RAN WG1 Meeting #92, R1-1803362, Athens, Greece, Feb. 26-Mar. 2, 2018, 26 pages.

"Report from LTE and NR User Plane Break-Out Session", Agenda 12.1.2, Source: Session Chair (InterDigital), 3GPP TSG-RAN WG2 Meeting #101, R2-1803735, Athens, Greece, Feb. 26-Mar. 2, 2018, 81 pages.

Supplementary European Search Report issued in corresponding European Application No. EP 18 91 0442, dated Feb. 9, 2021, 13 pages.

"Report from LTE and NR User Plane Break-Out Session", Source: Session Chair (InterDigital), Agenda Item: 12.1.2, 3GPP TSG-RAN WG2 NR Ad hoc 1801, Vancouver, Canada, Jan. 22-Jan. 26, 2018, 42 pages.

Second Office Action issued in corresponding Chinese Application No. 202010463063.6, dated Nov. 1, 2021, 11 pages.

Communication pursuant to Article 94(3) EPC issued in European Application No. 18910442.5, dated Dec. 14, 2021, 10 pages.

Notice of Reasons for Refusal issued in corresponding Japanese Application No. 2020-550065, dated Feb. 4, 2022, 10 pages.

Notification of Reason for Refusal issued in corresponding Korean Application No. 10-2020-7026948, dated Feb. 11, 2022, 8 pages.

"Remaining issues on contention free random access for beam failure", Agenda Item: 10.3.1.4.2, Source: Sharp, 3GPP TSG-RAN WG2#101, R2-1803046, Athens, Greece, Feb. 26-Mar. 2, 2018, 4 pages.

"Beam failure recovery procedure", Agenda Item: 10.3.1.4.2, Source: Ericsson, 3GPP TSG-RAN WG2 #101 Tdoc., R2-1803196, Athens, Greece, Feb. 26-Mar. 2, 2018, 3 pages.

"The timer and counter maintenance of BFR procedure", Agenda Item: 10.3.1.4.2, Source: OPPO, 3GPP TSG RAN2 #101 bis, R2-1804502, Sanya, China, Apr. 16-Apr. 20, 2018, 3 pages.

Decision of Rejection issued in corresponding Japanese application No. 2020-550065, dated Jun. 14, 2022.

Second Office Action issued in corresponding Korean application No. 10-2020-7026948, dated Aug. 26, 2022.

* cited by examiner

DATA TRANSMISSION METHOD AND DEVICE

CROSS-REFERENCE TO RELATED APPLICATIONS

This application is a continuation application of International Application No. PCT/CN2018/079524, filed on Mar. 20, 2018, which is incorporated by reference in its entirety.

BACKGROUND

The present disclosure relates to data transmission technology, and in particular, to a data transmission method and device.

In a wireless communication system with carrier aggregation (CA) characteristics, a terminal can communicate with network equipment through multiple serving cells. Among the multiple serving cells, one serving cell is a primary cell (PCell), and the other serving cells are secondary cells (SCells). The terminal may send uplink signals to network equipment through different serving cells.

In the actual application process, the terminal may have a beam failure situation of the serving cell, that is, the primary cell or the secondary cell.

SUMMARY

Various aspects of the present disclosure provide a data transmission method and device.

According to an aspect of the present disclosure, there is provided a data transmission method, including a terminal detecting data transmission situation of each of at least two serving cells, wherein the at least two serving cells include a primary cell and at least one secondary cell; and the terminal performing random access on a serving cell where a beam failure occurs to update serving beam of the serving cell, according to the data transmission situation of each of the serving cells.

According to another aspect of the present disclosure, there is provided a data transmission device, including a transmission detection unit, configured to detect data transmission situation of each of at least two serving cells, wherein the at least two serving cells include a primary cell and at least one secondary cell; and a random access unit, configured to perform random access on a serving cell where the beam failure occurs to update serving beam of the serving cell, according to the data transmission situation of each of the serving cells.

BRIEF DESCRIPTION OF THE DRAWINGS

In order to more clearly illustrate the technical solutions in the embodiments of the present disclosure, the drawings used in the embodiments will be briefly introduced below. Obviously, the drawings in the following description are of the present disclosure. For some embodiments, for those of ordinary skill in the art, other drawings can be obtained according to these drawings without paying creative labor.

DETAILED DESCRIPTION

In order to make the objectives, technical solutions, and advantages of the embodiments of the present disclosure clearer, the technical solutions in the embodiments of the present disclosure will be clearly and completely described with reference to the accompanying drawings in the embodiments of the present disclosure. Obviously, the described embodiments are a part of the embodiments of the present disclosure, but not all the embodiments. Based on the embodiments of the present disclosure, all other embodiments obtained by a person of ordinary skill in the art without creative efforts shall fall within the protection scope of the present disclosure.

The term "and/or" in this document is only a kind of association relationship describing related objects, which means that there can be three kinds of relationships. For example, A and/or B can mean: A exists alone, A and B exist simultaneously, and B exists alone in these three cases. In addition, the character "/" in this article generally indicates that the related objects are an "or" relationship.

Figure 1:
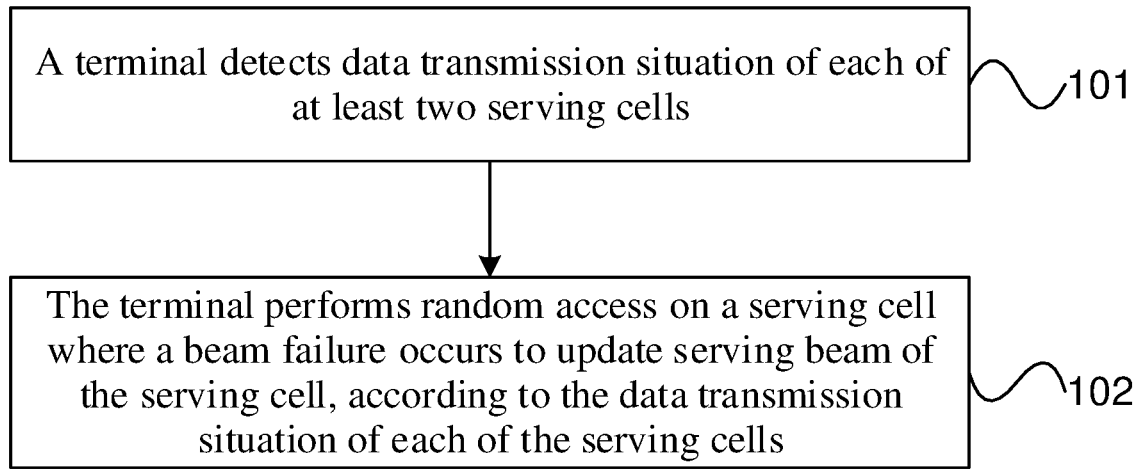
FIG. 1 is a schematic flowchart of a data transmission method according to an embodiment of the present disclosure.

FIG. 1 is a schematic flowchart of a data transmission method according to an embodiment of the present disclosure, as shown in FIG. 1.

101. A terminal detects the data transmission situation of each of at least two serving cells.

The at least two serving cells include a primary cell and one or more secondary cells. Specifically, the primary cell and the secondary cell may be classified specifically according to related technologies in the prior art, and details are not described herein again.

102. The terminal performs random access on the serving cell, where a beam failure occurs to update the serving beam of the serving cell, according to the data transmission situation of each of the serving cells.

The main idea of the present disclosure is that the terminal configures and maintains a timer and a counter for each of a plurality of serving cells thereof, including a primary cell and at least one secondary cell, which are used to detect the data transmission situation of each of the serving cells within the running time of the timer configured in each of the serving cells. If the beam failure occurs in a serving cell, the terminal may perform random access on the serving cell to update the serving beam of the serving cell to ensure the data transmission quality of the serving cell.

Optionally, in a possible implementation manner of this embodiment, in 101, the terminal may specifically maintain the timer and the counter configured for each of the serving cells, so as to count the number of times that the beam failure occurs within the running time of the timer configured in each of the serving cells.

In this implementation, the terminal may respectively configure a timer and a counter for each of the serving cells. The counter configured for each of the serving cells can record the number of times that the beam failure occurs in the serving cell within the running time of the timer configured in the serving cell.

When the first beam failure occurs in a serving cell, the terminal starts a timer configured in the serving cell, and increases the count value of a counter configured in the serving cell from 0 to 1 count unit, and starts counting (for example, the count value is increased by 1, and becomes 1). Within the running time of the timer configured in the serving cell, each time the beam failure occurs in the serving cell, the terminal may increase the count value of the counter configured in the serving cell by 1 count unit (for example, the count value is increased by 1).

If the timer configured in the serving cell expires, the terminal may reset the counter configured in the serving cell to 0, so that the terminal may continue to count the number of times that the beam failure occurs in the serving cell.

When the next new beam failure occurs in the serving cell, the terminal restarts the timer configured in the serving cell, and increases the count value of the counter configured in the serving cell from 0 to 1 count unit, and starts counting. For example, the count value is increased by 1 and becomes 1.

In a specific implementation process, the running time of the timer configured in each of the serving cells may be the same or may also be different, which is not limited in this embodiment.

In another specific implementation process, in 102, if the number of times that the beam failure occurs in the serving cell is equal to or greater than a pre-configured threshold within the running time of the timer configured in the serving cell, it indicates that the beam failure occurs in the serving cell, and the terminal may perform random access on the serving cell to update the serving beam of the serving cell.

In this implementation process, the terminal may specifically judge the count value of the counter configured in each of the serving cells and determine whether it is equal to or greater than a pre-configured threshold of number-of-times.

If the terminal judges that the count value of the counter configured in a serving cell is equal to or greater than a pre-configured threshold of number-of-times, it can be confirmed that the beam failure occurs in the serving cell, and the terminal can perform random access on the serving cell to update the serving beam of the serving cell.

In this implementation process, the threshold of number-of-times may be configured by a network device.

Specifically, the terminal may specifically receive a threshold of number-of-times sent by the network device through downlink control information (DCI), high-layer signaling, or system broadcast message.

For example, the high layer signaling may be a Radio Resource Control (RRC) message, and specifically, the threshold of number-of-times may be carried through an Information Element (IE) in the RRC message, and the RRC message may be RRC messages in the prior art, such as RRC CONNECTION RECONFIGURATION messages, etc., which are not limited in this embodiment. The IEs of existing RRC messages are extended to carry the threshold of number-of-times, or the RRC message may also be an RRC message different from those existing in the prior art.

Or, for another example, the high layer signaling may be a Media Access Control (MAC) Control Element (CE) message, and specifically, a new MAC CE message may be added to carry the threshold of number-of-times.

Or, for another example, the existing Master Information Block (MIB) or System Information Block (SIB) in the system broadcast message may be used to carry the threshold of number-of-times, or a new SIB may be added to carry the threshold of number-of-times.

It should be understood that the threshold of number-of-times may also be stipulated by an agreement.

In another specific implementation process, the terminal may specifically use a media access control (MAC) entity of the terminal to separately maintain the timer and the counter configured in each of the serving cells.

In a specific implementation of this implementation process, the MAC entity of the terminal may specifically maintain the timer and the counter configured in each of the serving cells. If the MAC entity of the terminal receives the first beam failure event of a serving cell reported by the physical layer of the terminal, the MAC entity of the terminal may start the timer configured for the serving cell and increase the count value of the counter configured in the serving cell from 0 to 1 count unit, and start counting (for example, the count value is increased by 1, and becomes 1). Within the running time of the timer configured in the serving cell, each time a beam failure occurs in the serving cell, the MAC entity of the terminal receives a beam failure event of the serving cell reported by the physical layer of the terminal, the MAC entity of the terminal may increase the count value of the counter by 1 count unit (for example, the count value is increased by 1). The beam failure event is reported by the physical layer of the terminal detecting the beam failure occurred in the serving cell.

For example, if the physical layer of the terminal detects that the block error rate (BLER) of the serving cell is greater than or equal to a preset transmission threshold, it means that the data transmission performance of the serving cell is severely degraded. In this case, the physical layer of the terminal may report a beam failure event of the serving cell to the MAC entity of the terminal.

If the timer configured in the serving cell expires, the MAC entity of the terminal can reset the counter configured in the serving cell to 0, so that the MAC entity of the terminal can continue to count the number of times that the beam failure occurs in the serving cell. When the next new beam failure occurs in the serving cell, the MAC entity of the terminal restarts the timer configured in the serving cell, and increases the count value of the counter configured in the serving cell from 0 to 1 count unit, and starts counting (for example, the count value is increased by 1 and becomes 1).

If the count value of the counter configured in the serving cell is equal to or greater than the pre-configured threshold within the running time of the timer configured in the serving cell, it can be confirmed that beam failure has occurred in the serving cell. The MAC entity of the terminal may trigger the terminal to perform random access on the serving cell to update the serving beam of the serving cell.

Optionally, in a possible implementation manner of this embodiment, after 102, if the random access is successful, the terminal may stop the timer configured in the serving cell where the beam failure occurs, and the counter configured in the serving cell where the beam fails is reset to 0, so that the terminal can continue to detect the data transmission situation of the serving cell.

In this embodiment, the terminal detects the data transmission situation of each of the serving cells in at least two serving cells, so that the terminal can perform random access on the serving cell where the beam failure occurs to update the serving beam of the serving cell, based on the data transmission situation of each of the serving cells, so that when the terminal experiences beam failures in the serving cell in a CA scenario, reliable data transmission is achieved, and the reliability of data transmission can be effectively guaranteed.

It should be noted that, for the foregoing method embodiments, for simplicity of description, they are all described as a series of action combinations, but those skilled in the art should know that the present disclosure is not limited by the described action order. Because according to the present disclosure, certain steps may be performed in another order or simultaneously. Then, those skilled in the art should also know that one or more of the actions and modules involved may not be necessarily required by the present disclosure.

In the above embodiments, the description of each embodiment has its own emphasis. For a part that is not described in detail in one embodiment, reference may be made to related descriptions in other embodiments.

Figure 2:
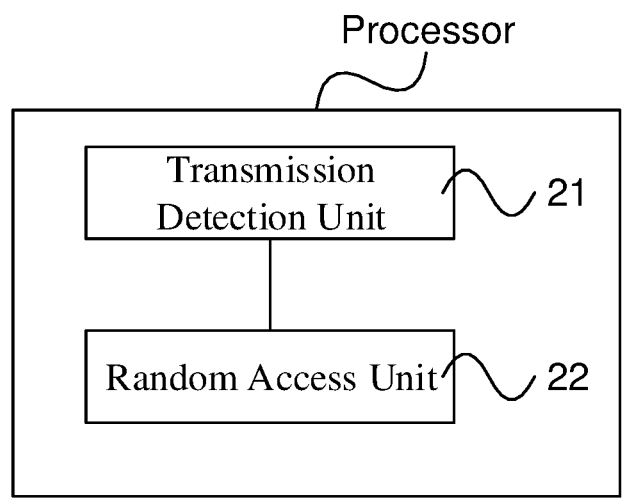
FIG. 2 is a schematic structural diagram of a data transmission device according to another embodiment of the present disclosure.

FIG. 2 is a schematic structural diagram of a data transmission device according to another embodiment of the present disclosure, as shown in FIG. 2. The data transmission device in this embodiment may include a transmission detection unit 21 and a random access unit 22. The transmission detection unit 21 is configured to detect data transmission of each of the at least two serving cells, wherein the at least two serving cells include a primary cell and at least one secondary cell; the random access unit 22 is configured to perform random access on the serving cell where a beam failure occurs according to the data transmission situation of each of the serving cells to update the serving beam of the serving cell.

It should be noted that the data transmission device provided in this embodiment may be a terminal.

Optionally, in a possible implementation manner of this embodiment, the transmission detection unit 21 may be specifically configured to maintain a timer and a counter configured in each of the serving cells, so as to count the number of times that the beam failure occurs in each serving cell, within the running time of the timer configured in each of the serving cells.

In a specific implementation process, the running time of the timer configured in each of the serving cells may be the same or may also be different, which is not limited in this embodiment.

In another specific implementation process, the random access unit 22 may be specifically configured to perform random access on a serving cell to update a serving beam of the serving cell if the number of times that the beam failure occurs in the serving cell is equal to or greater than a pre-configured threshold of number-of-times within the running time of the timer configured in the serving cell.

In this implementation process, the threshold of number-of-times may be configured by a network device or may be agreed by a protocol, which is not particularly limited in this embodiment.

In another specific implementation process, the transmission detection unit 21 may specifically be a MAC entity of a terminal, and separately maintain a timer and a counter configured in each of the serving cells. It can be specifically used to: maintain the timer and the counter configured in each of the serving cells; receive a beam failure event of a serving cell reported by the physical layer of the terminal, wherein the beam failure event is reported by the physical layer of the terminal detecting the beam failure occurred in the serving cell, and increases the count value of the counter by 1 count unit.

Optionally, in a possible implementation manner of this embodiment, the transmission detection unit 21 may be further configured to stop the timer configured in the serving cell where the beam failure occurs if the random access is successful, and reset the counter configured in the serving cell where the beam failure occurs to 0.

It should be noted that the method executed by the terminal in the embodiment corresponding to FIG. 1 may be implemented by the data transmission device provided in this embodiment. For detailed description, reference may be made to related content in the embodiment corresponding to FIG. 1, and details are not described herein again.

In this embodiment, the transmission detection unit detects the data transmission situation of each of the serving cells in at least two serving cells, so that the random access unit can, according to the data transmission situation of each of the serving cells, perform random access in the serving cell where a beam failure occurs to update the serving beam of the serving cell, so that when the terminal experiences beam failures of the serving cell in a CA scenario, the reliable data transmission can be achieved, and the reliability of data transmission can be effectively guaranteed.

It can be known from the foregoing technical solution that, in the embodiment of the present disclosure, the terminal detects the data transmission situation of each of the at least two serving cells, so that the terminal can, according to the data transmission situation of each of the serving cells, perform random access on the serving cell where the beam failure occurs to update the serving beam of the serving cell, and when the terminal experiences beam failures of the serving cell in a CA scenario, the reliable data transmission can be achieved, and the reliability of data transmission can be effectively guaranteed.

Those skilled in the art can clearly understand that, for the convenience and brevity of description, the specific working processes of the systems, devices, and units described above can refer to the corresponding processes in the foregoing method embodiments, and are not repeated here.

In the several embodiments provided by the present disclosure, it should be understood that the disclosed systems, devices, and methods may be implemented in other ways. For example, the device embodiments described above are only schematic. For example, the division of the unit is only a logical function division. In actual implementation, there may be another division manner For example, multiple units or components may be combined or can be integrated into another system, or some features can be ignored or not implemented. In addition, the displayed or discussed mutual coupling or direct coupling or communication connection may be indirect coupling or communication connection through some interfaces, devices, or units, which may be electrical, mechanical, or other forms.

The units described as separate components may or may not be physically separated, and the components displayed as units may or may not be physical units may be located in one place or may be distributed on multiple network units. Some or all of the units can be selected according to actual needs to achieve the purpose of the solution of this embodiment.

In addition, each functional unit in each embodiment of the present disclosure may be integrated into one processing unit (e.g., a processor), or each unit may exist separately physically, or two or more units may be integrated into one unit. The above-integrated unit may be implemented in the form of hardware, or in the form of hardware plus software functional units.

Finally, it should be noted that the above embodiments are only used to illustrate the technical solution of the present disclosure, rather than limiting them. Although the present disclosure has been described in detail with reference to the foregoing embodiments, those skilled in the art should understand that they can make modifications to the technical solutions described in the foregoing embodiments, or equivalent replacements of some of the technical features thereof; and these modifications or replacements do not depart from the spirit and scope of the technical solutions of the embodiments of the present disclosure.

What is claimed is:

1. A method for data transmission, comprising:
   detecting, by a terminal, data transmission situation of each of at least two serving cells, wherein the at least two serving cells comprise a primary cell and at least one secondary cell; and
   performing, by the terminal, random access on a serving cell where a beam failure occurs to update serving beam of the serving cell, according to the data transmission situation of each of the serving cells, wherein detecting the data transmission situation of each of the at least two serving cells comprises:

maintaining, by the terminal, a timer and a counter configured in each of the serving cells, to count a number of times that the beam failure occurs in each of the serving cells within a running time of the timer configured in each of the serving cells, and wherein performing the random access on the serving cell comprises:

performing, by the terminal, random access on the serving cell to update serving beam of the serving cell, in response to the number of times that the beam failure occurs in the serving cell being equal to or greater than a pre-configured threshold of number-of-times within the running time of the timer configured in the serving cell, wherein the running time of the timer is a duration after starting of the timer and before stopping, restarting, or expiring of the timer.

2. The method according to claim 1, wherein the running time of the timer configured in each of the serving cells is the same or different.

3. The method according to claim 1, wherein the threshold of number-of-times is configured by a network device or agreed by a protocol.

4. The method according to claim 1, wherein maintaining the timer and the counter configured in each of the serving cells comprises:

maintaining, by a media access control (MAC) entity of the terminal, the timer and the counter configured in each of the serving cells;

receiving, by the MAC entity of the terminal, a beam failure event of a serving cell reported by a physical layer of the terminal, wherein the beam failure event is reported by the physical layer of the terminal detecting the beam failure occurred in the serving cell; and increasing, by the MAC entity of the terminal, a count value of the counter by 1 count unit.

5. The method according to claim 1, further comprising, after performing the random access on the serving cell:

stopping, by the terminal, the timer configured in the serving cell where the beam failure occurs, and resetting the counter configured in the serving cell where the beam failure occurs to 0 if the random access is successful.

6. A device for data transmission, comprising a processor configured to:

detect data transmission situation of each of at least two serving cells, wherein the at least two serving cells comprise a primary cell and at least one secondary cell; and perform random access on a serving cell where a beam failure occurs to update serving beam of the serving cell, according to the data transmission situation of each of the serving cells, wherein, to detect the data transmission situation of each of the at least two serving cells, the processor is configured to:

maintain a timer and a counter configured in each of the serving cells to count a number of times that beam failure occurs in each of the serving cells within a running time of the timer configured in each of the serving cells, and wherein, to perform the random access on the serving cell, the processor is configured to:

perform random access on the serving cell to update serving beam of the serving cell in response to the number of times that the beam failure occurs in the serving cell being equal to or greater than a pre-configured threshold of number-of-times within the running time of the timer configured in the serving cell, wherein the running time of the timer is a duration after starting of the timer and before stopping, restarting, or expiring of the timer.

7. The device according to claim 6, wherein the running time of the timer configured in each of the serving cells is the same or different.

8. The device according to claim 6, wherein the threshold of number-of-times is configured by a network device or agreed by a protocol.

9. The device according to claim 6, wherein, to maintain the timer and the counter configured in each of the serving cells, the processor is configured to:

maintain the timer and the counter configured in each of the serving cells;

receive a beam failure event of a serving cell reported by a physical layer of the device, wherein the beam failure event is reported by the physical layer of the device detecting the beam failure occurred in the serving cell; and increase count value of the counter by 1 count unit.

10. The device according to claim 6, wherein the processor is further configured to:

stop the timer configured in the serving cell where the beam failure occurs, and reset the counter configured in the serving cell where the beam failure occurs to 0 if the random access is successful.

* * * * *